(12) United States Patent
Jiang et al.

(10) Patent No.: US 7,072,651 B2
(45) Date of Patent: Jul. 4, 2006

(54) METHOD AND SYSTEM FOR CELLULAR NETWORK TRAFFIC REDIRECTION

(75) Inventors: Yuen J. Jiang, Danville, CA (US);
Avnish Chauhan, Cupertino, CA (US);
Subhabrata Biswas, Mumbai (IN);
Bahadur Bhambhani, Mumbai (IN);
Alex Rodrigues, Mumbai (IN)

(73) Assignee: Roamware, Inc., San Jose, CA (US)

( * ) Notice: Subject to any disclaimer, the term of this patent is extended or adjusted under 35 U.S.C. 154(b) by 143 days.

(21) Appl. No.: 10/635,804

(22) Filed: Aug. 5, 2003

(65) Prior Publication Data

US 2004/0087305 A1 May 6, 2004

Related U.S. Application Data

(60) Provisional application No. 60/401,362, filed on Aug. 5, 2002.

(51) Int. Cl.
*H04Q 7/20* (2006.01)

(52) U.S. Cl. .............................. 455/432.1; 455/456.1; 455/452.1

(58) Field of Classification Search ........ 455/432–433, 455/435, 552, 434, 418–419, 414, 412, 456, 455/432.1, 456.1, 452.1
See application file for complete search history.

(56) References Cited

U.S. PATENT DOCUMENTS

| | | | |
|---|---|---|---|
| 5,353,328 A | 10/1994 | Jokimies | |
| 5,586,166 A | 12/1996 | Turban | |
| 5,903,832 A * | 5/1999 | Seppanen et al. | 455/435.3 |
| 5,930,701 A | 7/1999 | Skog | |
| 5,943,620 A | 8/1999 | Boltz et al. | |
| 5,987,318 A | 11/1999 | Alperovich et al. | |
| 5,987,325 A | 11/1999 | Tayloe | |
| 6,014,561 A | 1/2000 | Mölne | |
| 6,052,604 A | 4/2000 | Bishop et al. | |
| 6,058,309 A * | 5/2000 | Huang et al. | 455/433 |
| 6,075,855 A | 6/2000 | Christiansen et al. | |
| 6,138,005 A | 10/2000 | Park | |

(Continued)

FOREIGN PATENT DOCUMENTS

CA    CA 2281041 A1    2/2001

(Continued)

OTHER PUBLICATIONS

"Digital cellular telecommunications system (Phase 2+); Specification of the SIM Application Toolkit for the Subscriber Identity Module-Mobile Equipment (SIM-ME) interface (GSM 11.14 version 8.3.0 Release 1990)" STSI TS 101 267 V8.3.0, XX, XX, Aug. 2000.

(Continued)

*Primary Examiner*—Erika A. Gary
*Assistant Examiner*—Wayne Cai
(74) *Attorney, Agent, or Firm*—Courtney Staniford & Gregory LLP

(57) ABSTRACT

A system and apparatus for redirecting wireless network traffic. Embodiments include determining when a roaming mobile station initiates a registration attempt with a non-preferred network and causing the roaming mobile station to initiate a registration attempt with a preferred network. Embodiments further include a traffic redirection network entity including a traffic redirection node, a traffic redirection application, and a traffic redirection probe.

16 Claims, 11 Drawing Sheets

U.S. PATENT DOCUMENTS

| | | | |
|---|---|---|---|
| 6,148,197 | A | 11/2000 | Bridges et al. |
| 6,163,701 | A | 12/2000 | Saleh et al. |
| 6,185,295 | B1 | 2/2001 | Frederiksen et al. |
| 6,192,255 | B1 | 2/2001 | Lewis et al. |
| 6,195,532 | B1 | 2/2001 | Bamburak et al. |
| 6,456,845 | B1 | 9/2002 | Drum et al. |
| 6,456,859 | B1 | 9/2002 | Desblancs et al. |
| 6,463,298 | B1 * | 10/2002 | Sorenson et al. ........ 455/552.1 |
| 6,603,986 | B1 | 8/2003 | Anvekar et al. |
| 6,738,636 | B1 | 5/2004 | Lielbriedis |
| 6,764,003 | B1 | 7/2004 | Martschitsch et al. |
| 6,856,818 | B1 | 2/2005 | Ford |
| 2002/0012351 | A1 | 1/2002 | Sofer et al. |
| 2002/0160763 | A1* | 10/2002 | Mittal et al. ................ 455/418 |
| 2002/0191575 | A1 | 12/2002 | Kalavade et al. |
| 2003/0064723 | A1 | 4/2003 | Thakker |
| 2003/0129991 | A1* | 7/2003 | Allison et al. .............. 455/456 |

FOREIGN PATENT DOCUMENTS

| | | |
|---|---|---|
| WO | WP 00/18156 | 3/2000 |
| WO | WO 01/65884 A1 | 9/2001 |
| WO | WO 03/019969 A1 | 3/2003 |

OTHER PUBLICATIONS

"Digital cellular telecommunications system (Phase 2+); Universal Mobile Telecommunications System (UMTS); General Packet Radio Service (GPRS) Service description; Stage 2 (3GPP TS 23.060 version 5.4.0 Release 5)" ETSI TS 123 060 V5.4.0, Dec. 2002, pp. 1-207 (XP-014007573).

"Digital cellular telecommunications system (Phase 2+); Universal Mobile Telecommunications System (UMTS); General Packet Radio Service (GPRS); GPRS Tunnelling Protocol (GTP) across the Gn and Gp interface (3GPP TS 29.060 version 5.4.0 Release 5)" ETSI TS 129 060 V5.4.0, Dec. 2002, pp. 1-102 (XP-002298277).

Ala-Laurila, et al., "Wireless LAN Access Network Architecture for Mobile Operators," IEEE Communications Magazine, Nov. 2001, pp. 82-89 (XP-001107810).

Brünen, M. "Roaming im Zugangsnetz Mit OWLAN überall zu Hause sein," Net—Zeitschrift Fuer Kommunikationsmanagement, Huthig Verlag, Heilderberg, 2002, pp. 39-42 (XP-001122438).

GSM Association Permanent Reference Document: IR.33, PRD IR.33 "GPRS Roaming Guidelines," version 3.2.0, Apr. 3, 2003, pp. 1-20 (XP-002298278).

Ostrowski, F., "Roaming und Handover zwischen UMTS und Funk-LA," NTZ (Nachrichtentechnische zeitschrift), 2002, pp. 24-26 (XP-001124094).

Salkintzis, et al., "WLAN-GPRS Integration for Next-Generation Mobile Data Networks," IEEE Wireless Communications, Oct. 2002, pp. 112-123 (XP-001132263).

Telenor (origin GSMA), "Inter-PLMN Backbone Guidelines," S3z000005 3GPP TSG SA WG3 Security—S3#15bis, Ad-Hoc Meeting Nov. 8, 2000, pp. 1-30 (XP-002298276).

"Universal mobile telecommunications system (UMTS) NAS Functions related to Mobile Station MS in idle mode" ETSI TS 123 122 V3.1.0, Jan. 2000, pp. 1-33.

"Digital cellular telecommunications system (Phase 2+) GSM; Universal Mobile Telecommunications System (UMTS); Mobile Radio Interface layer 3 specification; Core Network protocols, Stage 3" ETSI TS 124 008 V3.2.1, Jan. 2000, pp. 62-69 and 376.

* cited by examiner

Passive Monitoring

METHOD AND SYSTEM FOR CELLULAR NETWORK TRAFFIC REDIRECTION

RELATED APPLICATIONS

This application claims priority from U.S. Provisional Patent Applications Ser. No. 60/401,362, entitled TRAFFIC REDIRECTION, filed Aug. 5, 2002.

TECHNICAL FIELD

The disclosed embodiments relate to methods and system for directing cellular network traffic.

BACKGROUND

There are many mobile or cellular network operators, or providers, in the world, often more than one in a single country. These network operators include, but are not limited to, operators who provide mobility services using GSM, GPRS, 3G, CDMA, TDMA, PHS, WCDMA, IDEN and WLL technology or their variants. These network operators provide voice and data services to their own subscribers and to subscribers from other networks. When the network operator provides service to a subscriber from a foreign country, it is referred to as "international roaming". When the network operator provides service to a subscriber from another network in the same country, it is referred to as "domestic roaming".

When the subscriber is registered in the network with which it has a direct billing relationship, the serving network is often referred to as the Home Public Mobile Network or HPMN. If the subscriber is in a network with which it does not have a direct billing relationship, the serving network is referred to as the Visited Public Mobile Network or VPMN, and the subscriber is referred to as an in-roamer by the VPMN. The same subscriber is referred to as an out-roamer by the HPMN. In such a case, the in-roamers are treated as temporary subscribers from a service availability perspective, while the billing for usage incurred by them is through inter-carrier settlements via the home network of the subscriber.

Various network operators have partnership agreements with each other that include more favorable roaming charges than non-partners receive. Partner networks are "preferred" networks for the network operator's subscriber to register with when roaming. Non-partner networks are "non-preferred" networks to the subscriber. Network operators can maximize their margins and the roamers can get more attractive roaming rates and services if roamers roam on their home mobile operator's preferred partner networks.

When "home" subscribers roam into visited networks, they may roam onto one, two or more VPMNs, any one at a time, based on various criteria. To better understand this, consider the cases when the handset can be in one of two modes: automatic network selection mode; or manual network selection mode.

In automatic mode, the handset automatically uses a set of rules to find the network to register with. The order of these rules may be handset vendor dependent; however, industry specifications state the order as:

1. The home network if it is available (based on MCC and MNC from IMSI); the list of networks from the Preferred PLMN List (EFPLMNSEL on SIM card) in priority order excluding the previously selected PLMN (the handset scans the GSM 900 frequency band before it scans the GSM 1800 frequency band);

4. Other PLMN with a received signal level above −85 dBm in random order excluding the previously selected PLMN; and 5. Any other PLMN excluding the previously selected PLMN in order of decreasing signal strength or alternatively the previously selected PLMN may be chosen ignoring its signal strength.

In manual mode, the handset shows a list of available networks to the user. The user selects one of them and the handset attempts registration onto that network. If the registration is not successful, the handset shows the list of networks to the user once again. In manual mode, the user has selected a particular network, so preferred VPMN selection from the HPMN perspective should not apply. However, a majority of current handsets are in automatic selection mode, and the HPMN is keen on controlling and/or influencing the roaming network chosen by its out-roamers. Also, since the HPMN would like to honor the manual selection mode, it has to identify the current settings on the handset. However, implementing a seamless mechanism to do this has been a challenge thus far.

Over the last few years, the revenues to network operators from home subscribers have consistently declined due to increased competition and resulting pricing pressures. On the other hand, revenues from roamers have consistently grown in the same period due to increased mobile penetration in local markets and an increase in travel. Moreover, roaming revenues are high-margin revenues that typically comprise between 8–25% of the total network operator revenues. Hence, protecting the existing roaming revenues and growing them further has become an important priority for the network operators worldwide.

Some operators also own networks in various countries. These operators would like to make sure their out-roamers stay within the group properties, or stay on preferred networks, in order to gain the best service experience even when roaming. They will also be able to offer geography based price plans (for example, a single rate all across Western Europe or South East Asia) to users who have subscribed to such plans. In addition, as new technologies keep rolling out, operators can control the rollout schedule across their own properties and also make sure interoperability issues are taken care of. Keeping roaming subscribers on preferred networks gives the best service experience to the subscriber. However, current methods of controlling which network a subscriber registers on when roaming have disadvantages.

For example, a commonly-used method of attempting to prevent roaming subscribers from registering with non-preferred networks includes storing a list of preferred networks on a SIM in the subscriber's handset (a Preferred PLMN list). The list can be burned on the SIM or updated using Over-The-Air (OTA) messages. This list influences the initial selection of the preferred network. However, due to various reasons (for example, the preferred network is not currently available or there is a temporary loss of coverage), the handset may also select a non-preferred network. The existing approach cannot control this situation and hence once the user is on a non-preferred network, he/she will remain there unless the non-preferred network loses the radio coverage. Even when the handset is powered off, the non-preferred network stays on the SIM card and on next power on it will be selected according to rules described herein. Thus, once the handset initiates an attempt to register on a non-preferred network, the network operator loses control of the roamer.

It would be advantageous for the network operator to retain some control over a roaming subscriber handset even when a handset has initiated a registration attempt with a non-preferred network for any reason, such as failure of the SIM network list to produce registration on a preferred network.

BRIEF DESCRIPTION OF THE FIGURES

In the drawings, the same or similar reference numbers identify similar elements or acts.

DETAILED DESCRIPTION

Figure 1:
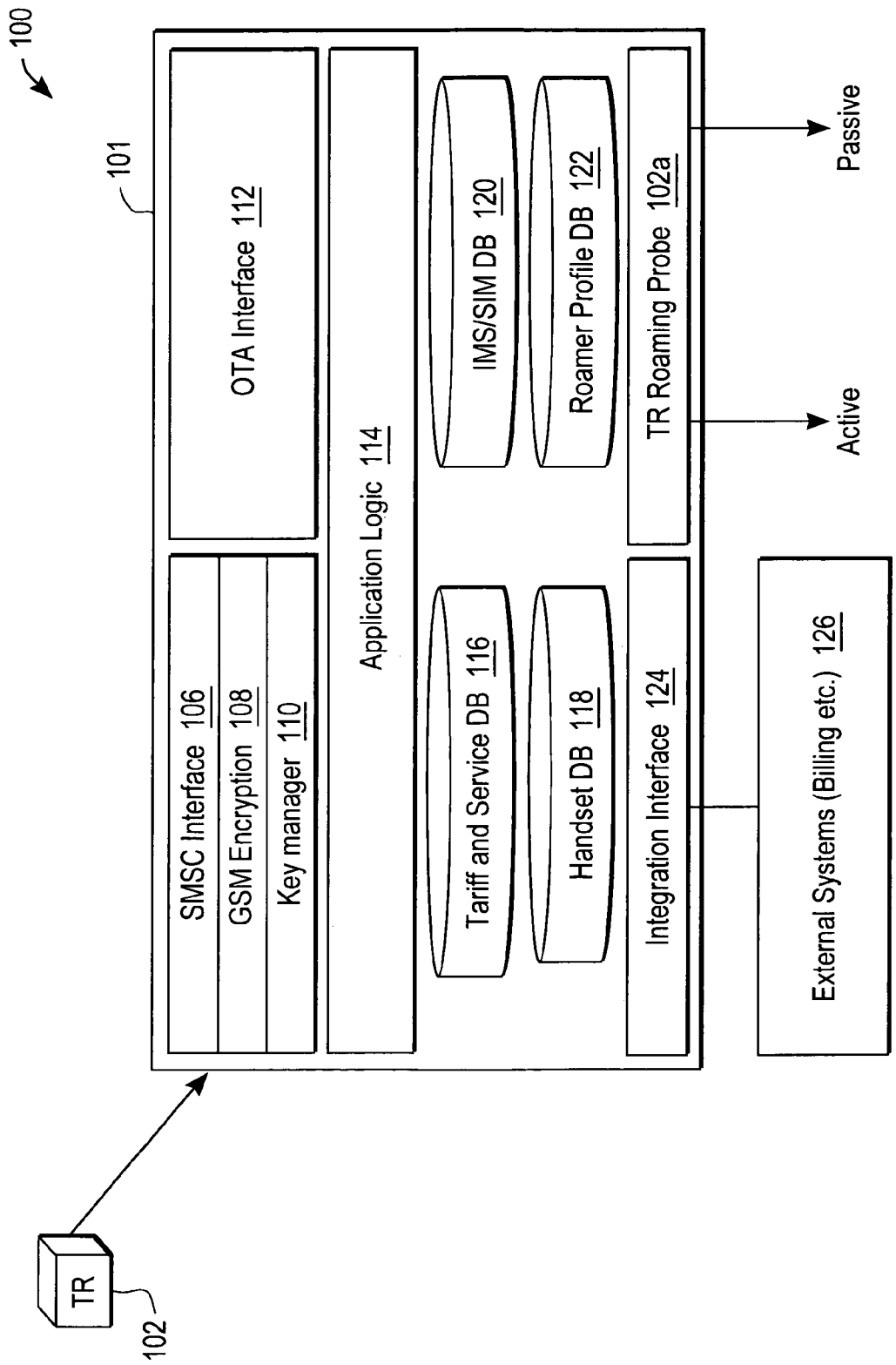
FIG. 1 is a block diagram of an embodiment of a traffic redirection system.

A method and system are described for redirecting wireless network voice and data traffic under control of a network operator when a subscriber is roaming. Various embodiments of the invention include redirecting a handset when the handset has initiated a registration attempt with a non-preferred network. Various embodiments of the invention include redirecting a handset when the handset attempts to register with a non-preferred network. Various embodiments of the invention include redirecting a handset after the handset successfully registers with a non-preferred network. The embodiments described can be used as a complement to existing traffic redirection methods, such as preferred PLMN lists. More than one approach can be combined to enhance the user experience. The various traffic redirection methods described are transparent to the subscriber. An Appendix includes an explanation of numerous acronyms used herein and is included below for reference. Therefore, various acronyms used may not be spelled out in the body of the document.

Herein terms such as handset, subscriber, user, etc., may be used interchangeably to indicate an actor that is registering with a network. These terms are used for convenience, but in fact, the actor that registers with the network could be any combination of hardware and software capable of registering on a wireless network, e.g., a personal digital assistant (PDA) or personal computer (PC). The method and system described apply to any network entity that can register with one of several networks.

Embodiments described herein include OTA traffic redirection methods and "registration rejection" traffic redirection methods.

OTA methods include the following components: detecting the network the roamer is currently on; traffic redirection (TR) application logic deciding whether the roamer should be moved to a different (preferred) network; sending OTA messages to update certain files on the SIM card and then instructing the handset to refresh its cache; and sending OTA or SMS messages to the SIM toolkit application on the handset so that the application switches the roamer to a preferred network. In the final component just listed, the SIM toolkit application switches the roamer to a preferred network using one of two approaches: updating SIM card files and then instructing the handset to refresh its cache; or instructing the handset to select a particular network directly.

Registration rejection methods include the following components: detecting the network the roamer is currently on; the TR application logic deciding whether the registration process should be allowed to succeed or should be rejected; if the network is to be rejected, various approaches are taken to reject the Update Location with various error codes or to send a subscriber profile with information that makes the handset search for a new network; if a preferred network is not found, the TR application logic can decide that the user should be provided service on any available network, and hence registrations on non-preferred networks are also allowed to go through; a mechanism to initiate Update Location on demand is also provided, and this can be used to make the handset trigger an Update Location periodically; in some embodiments, it is determined whether the handset is in manual or automatic network selection mode; and it is also determined whether the handset is in the midst of a voice or GPRS/MMS session.

Both the OTA approaches and the registration rejection approaches involve first detecting that the subscriber is roaming in another network. The two types of approaches also share various databases (to be described below) of information that are used to make traffic redirection decisions.

FIG. 1 is a block diagram of one embodiment of a traffic redirection system 100. The system 100 includes network operator backend processes (or "backend") 101, external systems 126, and traffic redirection network (TR) element 102. These elements are used by the network operator to provide wireless services to subscribers, such as cellular phone users. Subscribers or users buy services from the operator, including voice and data services that the user can access with a phone, a PDA, a PC, or any device (not shown in this figure) that can communicate on a wireless network. The user device is generically referred to as a mobile station in the wireless network. For convenience herein, the mobile station will usually be referred to as a handset.

The network provider backend 101 includes an SMSC interface 106, a GSM encryption element 108, and a key manager 110. The key manager has control over certain keys in the handset. For example, the handset may have an OTA key lock that prevents writing to the handset SIM without network operator permission. The network operator backend 101 further includes an OTA interface 112 for sending and receiving OTA messages, and application logic 114 for providing and controlling specific wireless services. The network operator backend 101 further includes various databases, including a tariff and service database 116, a handset database 118, an IMSI/SIM database 120, and a roamer profile database 122. Various databases are described in more detail below.

The network operator backend 101 further includes an integration interface 124 for facilitating communication with other systems.

Traffic redirection elements of the system 100 include a traffic redirection (TR) network element 102. The TR network element 102 includes a TR roaming probe 102a, and a TR node (not shown in this figure), and a TR application (not shown in this figure). Each of these is described in more detail below. The TR node, the TR application, and the TR roaming probe may or may not be physically co-located in various embodiments, but all are considered parts of the TR network element.

The TR roaming probe 102a monitors the handset in either a passive or active mode to determine such things as when the handset is attempting to register on a network and which network the handset is currently registered on.

Figure 2:
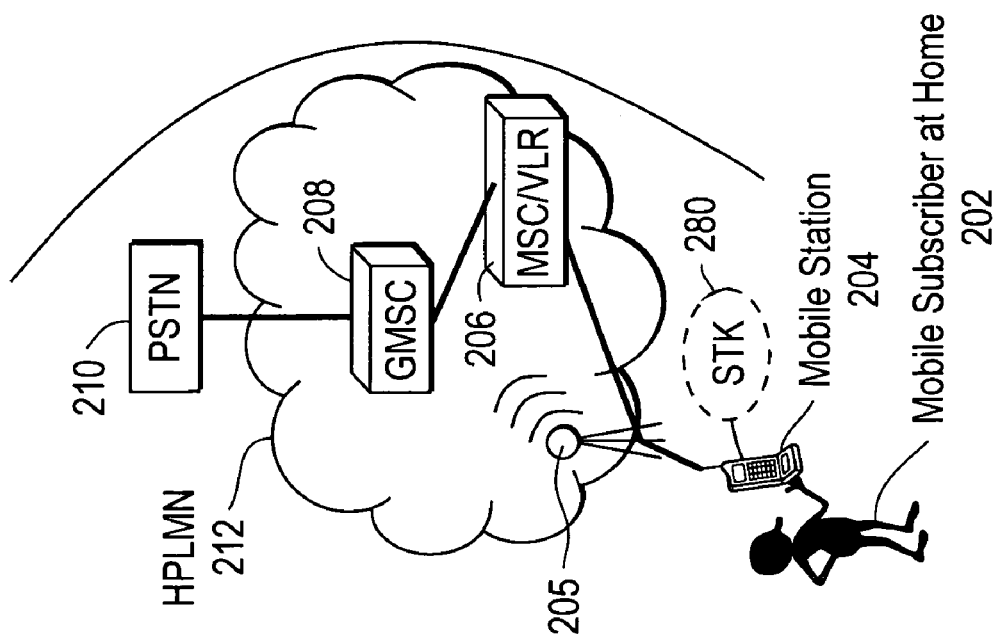
FIG. 2 is a block diagram of an embodiment of a traffic redirection system that shows one of the network operator's subscribers within the subscriber's home network.

FIG. 2 is a diagram that shows one of the network operator's subscribers 202 within the subscriber's home network. The subscriber 202 is a "home" subscriber from the perspective of the network operator that owns the network operator backend 101. The subscriber 202 has a mobile station or handset 204 which communicates over the wireless network with a home network or HPLMN 212 through a base station 205 and an MSC/VLR 206. In the embodiment shown, there is a SIM toolkit application (STK) 280 resident on the handset 204, and it will be described in more detail below. In further figures throughout this description, the handset 204 is shown without the STK 280, which is optional. The handset 204, whenever shown, may or may not include the STK 280, and embodiments which include the STK 280 will be described accordingly. The HPLMN 212 communicates with a public switched telephone network (PSTN) 210 via a GMSC 208.

Detecting Out-roamers: Passive Mode

Figure 3:
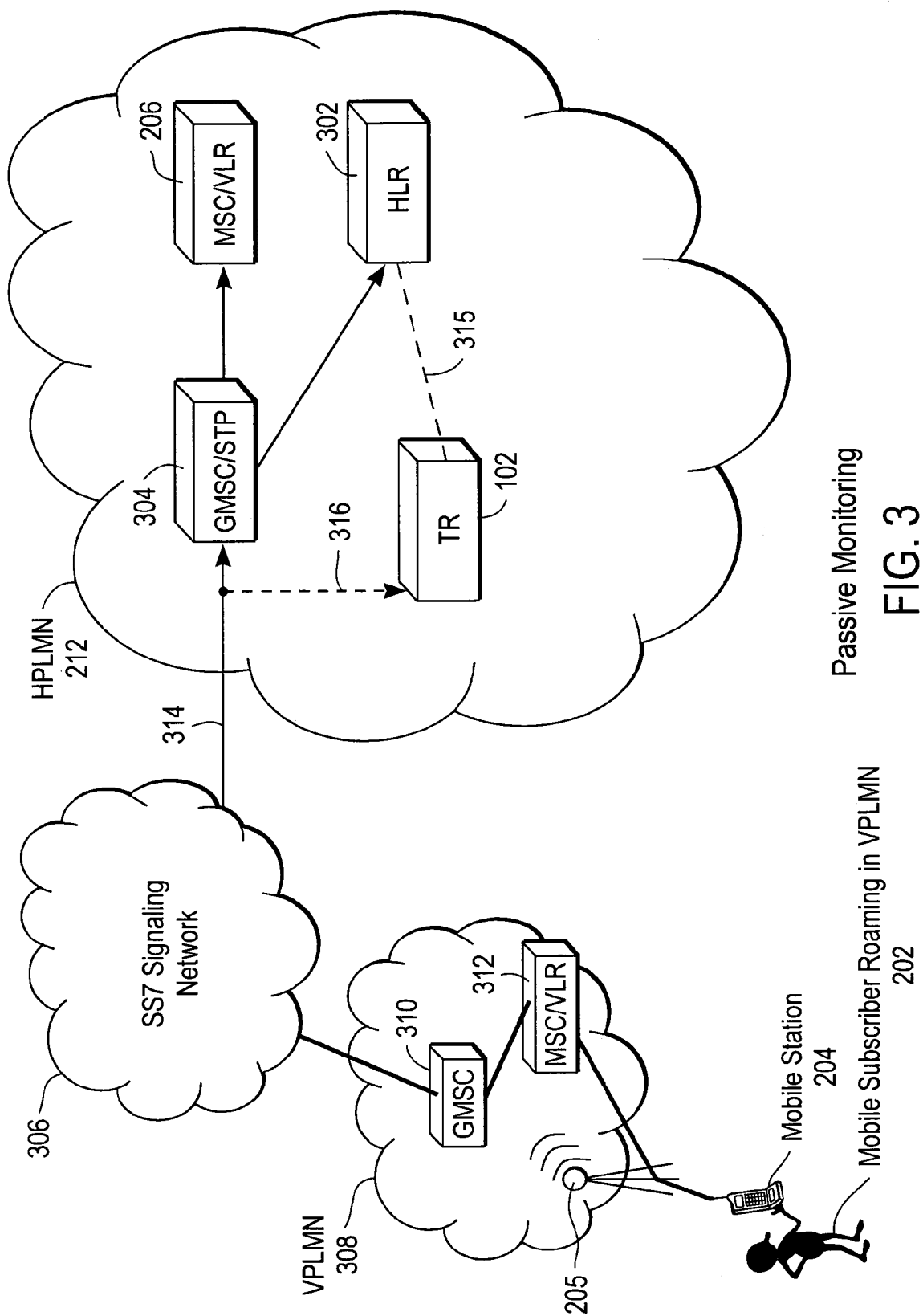
FIG. 3 is a block diagram of an embodiment of a traffic redirection system illustrating passive monitoring.

A passive monitoring approach, according to an embodiment, includes monitoring the SS7 MAP signaling messages on the external signaling links between the operator STP/GMSC and the signaling provider. With reference to FIG. 3, the mobile subscriber 202 is roaming in a VPMN 308. The VPMN 308 and the subscriber's HPMN 212 have a roaming relationship such that the HPMN 212 subscribers are allowed to get service on the VPMN 308. When the roaming mobile subscriber's handset 204 registers on the network 308, it initiates a registration process such that a VLR 312 sends a MAP Update Location message to an HLR 302 in the HPMN 212 of the roaming subscriber 202. Passive monitoring includes using high impedance probes on a SS7 signaling link 314 between a GMSC/STP 304 of the HPMN 212 and a SS7 signaling network 306. The high impedance ensures that the probing does not interfere with the regular information exchange between the VPMN 308 and the HPMN 212. Alternatively, the link between the GMSC/STP 304 and the HLR 302 can be monitored. Any MAP messages can be monitored. In one embodiment, at least the following MAP messages are monitored:

MAP Update Location request and response;

MAP Cancel Location request and response; and

MAP Insert Subscriber Data request and response.

In some cases, the probes used to monitor the SS7 signaling link 314 may belong to a third party and the information exchanged with the TR network element 102 may use Files, Sockets, FTP, custom trigger etc. In yet other cases, a HPMN HLR 302 may initiate a trigger to an external application, such as the TR application or TR network element 102, on every Update Location message, as shown by path 315.

Detecting Out-roamers: Active Mode

Figure 4:
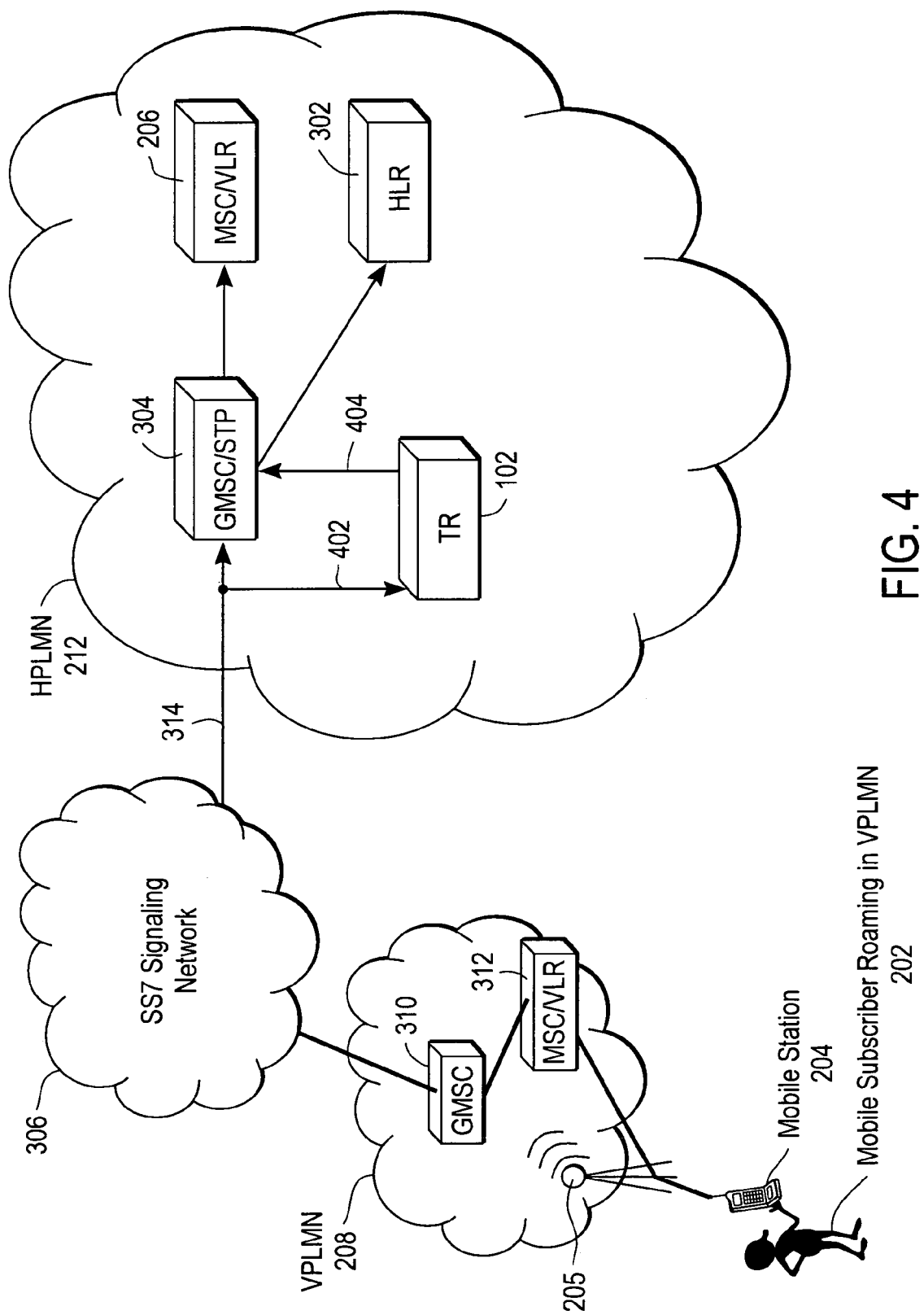
FIG. 4 is a block diagram of an embodiment of a traffic redirection system illustrating active monitoring.

In the active mode, the TR network element 102 includes a node in the signaling path 314 of the Update Location message between the VLR 312 in the VPMN 308 and the HLR 302 in the HPMN 212. With reference to FIG. 4, the subscriber 202 is roaming in VPMN 308. The VPMN 308 and the HPMN 212 have a roaming relationship such that HPMN 212 subscribers are allowed to get service on the VPMN 308. When the roaming subscriber's handset 204 registers on the network 308, it initiates a registration process such that the VLR 312 sends a MAP Update Location message on the SS7 signaling network 306 directed towards the HPLMN 212 of the subscriber 202. In one embodiment, the TR network element 102 is in the signaling path 314 before the messages go to the HLR 302 and before the response from the HLR 302 goes back to the VLR 312 in the VPMN 308.

Embodiments of the invention contemplate various approaches to routing the signaling messages via the TR network element 102 using links 402 and 404. The following approaches are not meant to be an exhaustive list.

In one approach, the signaling provider routes all messages with a E.214 numbering plan type to the TR network element 102 instead of to the network operator GMSC/STP 304. The TR network element 102 internally routes the messages via the network operator GMSC/STP 304 and hence stays in the signaling path by acting as a specialized STP.

Alternatively, the network operator GMSC/STP 304 is configured such that if the Called Party address is an HLR 302 address (SSN=6) and the numbering plan type is E.214, the message gets routed via the TR network element 102.

Another alternative is configuring the operator GMSC/STP 304 to send all the E.214 messages to the HLR 302. However, in response to the Insert Subscriber Data message, if the Called Party Address is outside the operator's numbering plan and the Called SSN is a VLR 312 SSN (SSN=7), the messages are routed via the TR network element 102. This achieves the same result as the second alternative listed above but limits the number of messages that go via the TR network element 102 since only messages meant for external networks need to be handled.

Yet another alternative is for the external signaling provider to send all Update Location messages using a non-zero Translation Type. The operator STP 304 routes all E.214 messages with a specific Translation Type (for example, TT=10) to the TR network element 102. The TR network element 102 changes the TT to 0 and routes it back to the GMSC/STP 304 after which it is routed to the HLR 302.

In some cases, the HLR 302 will initiate a trigger to an external application, such as the TR network 102 TR application, when it receives an Update Location message from the VPMN VLR 312. In any case, the TR network element 102 has the capability to trigger the OTA message to the handset, timeout the message, send a reject message or even modify the information exchanged in the messages between the HLR 302 and the VLR 312.

Information Databases

The network operator may chose to use various data elements in order to selectively redirect registration traffic. For example, pre-paid users may need to be redirected to a specific network while post-paid users are be redirected to another preferred network in the same country and coverage area. Even within these segments, the operator may have business rules to determine if the roamer is a GPRS/MMS subscriber or just a voice call user. Based on such service profile information, further preference for networks can be established. Some of the database entities that are contemplated for embodiments are listed below.

A Country and Network database contains a list of networks and the countries they are in. Each country can be selectively barred for registration rejection traffic redirection. If the country is barred, each of the networks in the country is also barred for registration rejection traffic redirection. If the country is not barred, it is possible to set the barred or not barred status on a per network basis. In addition, it is possible to specify if a particular network is an outbound roaming partner. Network-specific information contains roaming attributes that indicate, for example, whether pre-paid roaming is allowed on a network, whether GPRS roaming is available on a network, whether roaming minutes are agreed to for volume discounting, etc.

A Device Capabilities database contains a list of TAC and FAC codes for the various handsets in the market. This database also contains various attributes related to the handset capabilities. For example, the particular proactive SIM REFRESH modes supported, whether the handset is a GPRS handset, whether the handset updates EFLOC, on power-off, etc.

A subscriber Device Information database contains the subscriber's IMSI, MSISDN and particular device. When a particular traffic redirection approach has handset dependencies, this database can be used to select the appropriate approach to take in order to effect the traffic redirection.

A Roaming Partners Tariff database includes tariff information and also typically contains information regarding whether the roaming partner is part of a global or geographical tariff plan, whether charges are incurred per minute, or per second, or per six seconds, whether there is a minimum charge, etc.

A Roamer Profile database includes a "blacklist" database and a "white list" database. The white list database contains the IMSI values for subscribers for which registration rejection traffic redirection should be applied. If this list is activated, the traffic redirection works only for these specific IMSI values; remaining subscribers are not affected. Similarly the black list database contains a list of IMSI values for which the traffic redirection is never attempted. All SIM cards issued to roaming partners should be included in this database to assure intended traffic redirection.

A Subscription Identification databases includes information regarding pre-paid, post-paid, GPRS, and MMS subscribers. Pre-paid roamers are typically identified using a database that is populated by the operator. Similarly, the database has information on GPRS and MMS subscription. The ISD messages on the roaming links can be monitored to identify pre-paid roamers (for example, using CAMEL service mark and SCF address).

Other information related to decision making in the traffic redirection process includes: Barring Time, or the time during which traffic redirection should not be attempted; National TR, which is a flag to indicate whether traffic redirection should be attempted for national roaming; and System configuration data, such as OTA Server information, SMSC Configuration etc.

Some of these databases are shown in FIG. 1.

Over-The-Air (OTA) Traffic Redirection Approach

The OTA based traffic redirection involves interaction with the handset and SIM card capabilities. In one embodiment, files on the SIM card are updated, and the handset is instructed to refresh its cache and potentially do a new search for available networks.

Figure 5:
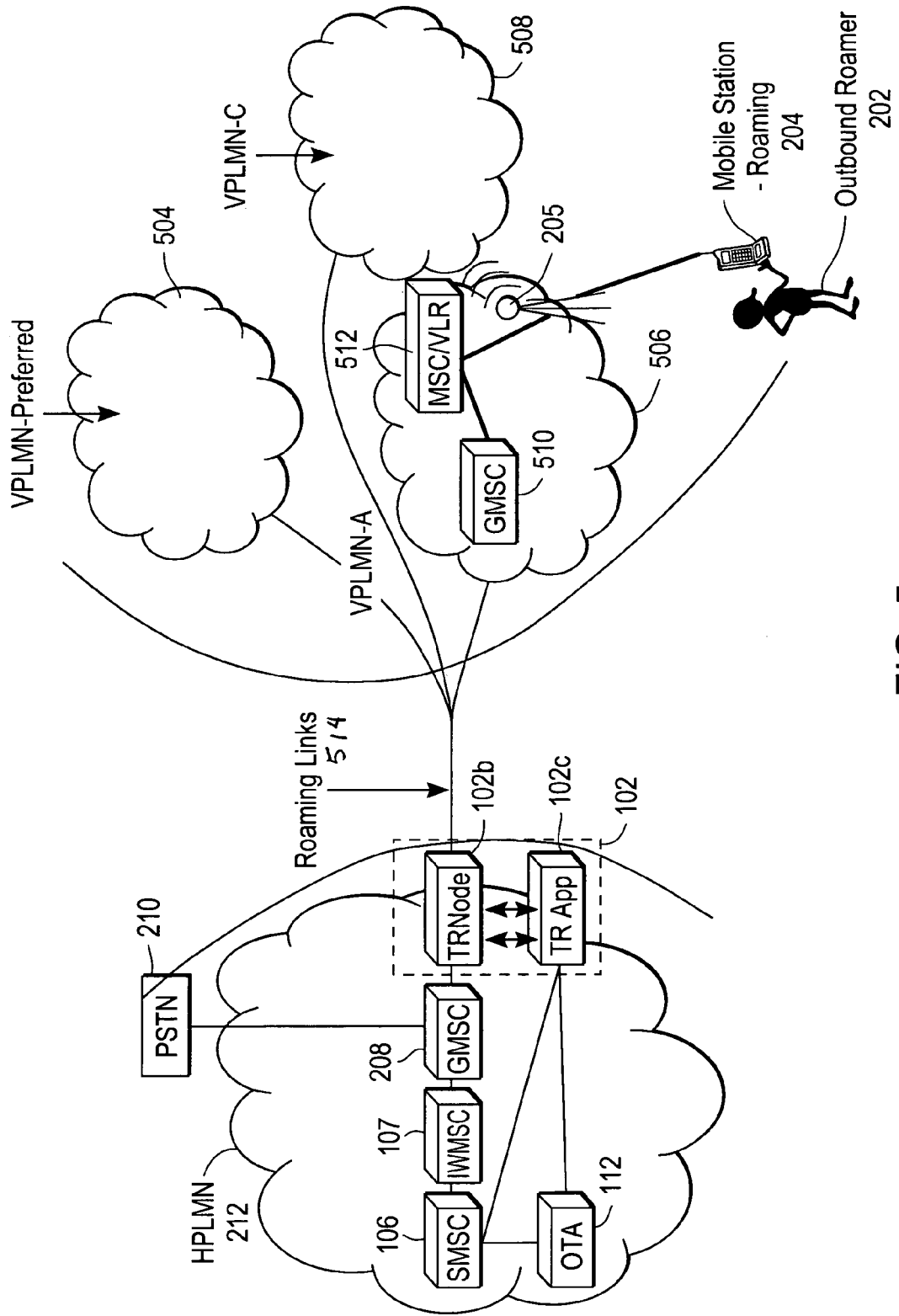
FIG. 5 is a block diagram of an embodiment of a traffic redirection system illustrating Over-The-Air (OTA) based traffic redirection.

FIG. 5 is a diagram that illustrates embodiments of OTA traffic redirection. In FIG. 5, the subscriber 202 is away from the home network, HPLMN 212. Several networks are available for the subscriber 202 to roam on, including VPLMN 504, VPLMN 506, and VPLMN 508.

The HPLMN 212 communicates with the various VPLMNs through the TR node 102b of the TR network element 102 and international roaming links 514. Elements of the HPLMN 212 include the GMSC 208, an IWMSC 107, the SMSC interface 106, and the OTA interface 112.

Over-The-Air (OTA) Traffic Redirection Approach with Optional SIM Toolkit Application (STK)

As shown in FIG. 2, an STK application 280 may be installed on the SIM card in the roamer mobile station 204. Certain SIM cards do not respond to OTA messages directly. One approach to communicating with such SIMs is placing an STK on the SIM to behave as a proxy or intermediary that can receive OTA messages and communicate appropriately with the SIM. Then instead of the network messaging directly updating the files on the SIM card and asking the SIM card to update its cache, all of that information is sent to the STK, which is directed to update the SIM for the network.

The STK application 280 registers for three Event Download messages—Location Status, Call Connected and Call Disconnected. Every time the Location Area changes, the Location Status event is downloaded to the STK application 280. Similarly, for every MO and MT call, the Call Connected event is downloaded. When the call clears, the Call Disconnected event is downloaded to the STK application 280.

The Call Connected and Disconnected events contain information on MO or MT calls. During a call, the roamer will not be switched to another network.

The Location Status event contains the following information:

Location Status—contains the current service state of the Mobile Station. Can have values Normal Service, Limited Service or No Service;

Location Status—contains the current service state of the Mobile Station; Location Status have values including Normal Service, Limited Service or No Service;

If the currently selected MCC and MNC are not the same as the home network (identified in GSM networks using the first few digits of IMSI), the SIM Toolkit Application detects that the user is roaming in the VPMN. It can then initiate mechanism to move the user to the preferred network by sending this information to the HPMN via SMS, USSD or a URL invocation (using WIB, for example). Additionally, if the handset and SIM support the RUN AT service, the RUN AT+COPS command can also be invoked.

Using an STK provides an additional capability. The STK allows a RUN AT command to be issued over the network, for example, by the TR network entity. A Run AT command allows the STK to directly command the handset, for example, to change from a current network to another specified network. Traffic redirection approaches involving STKs and the Run AT command will be explained more fully below.

Figure 6:
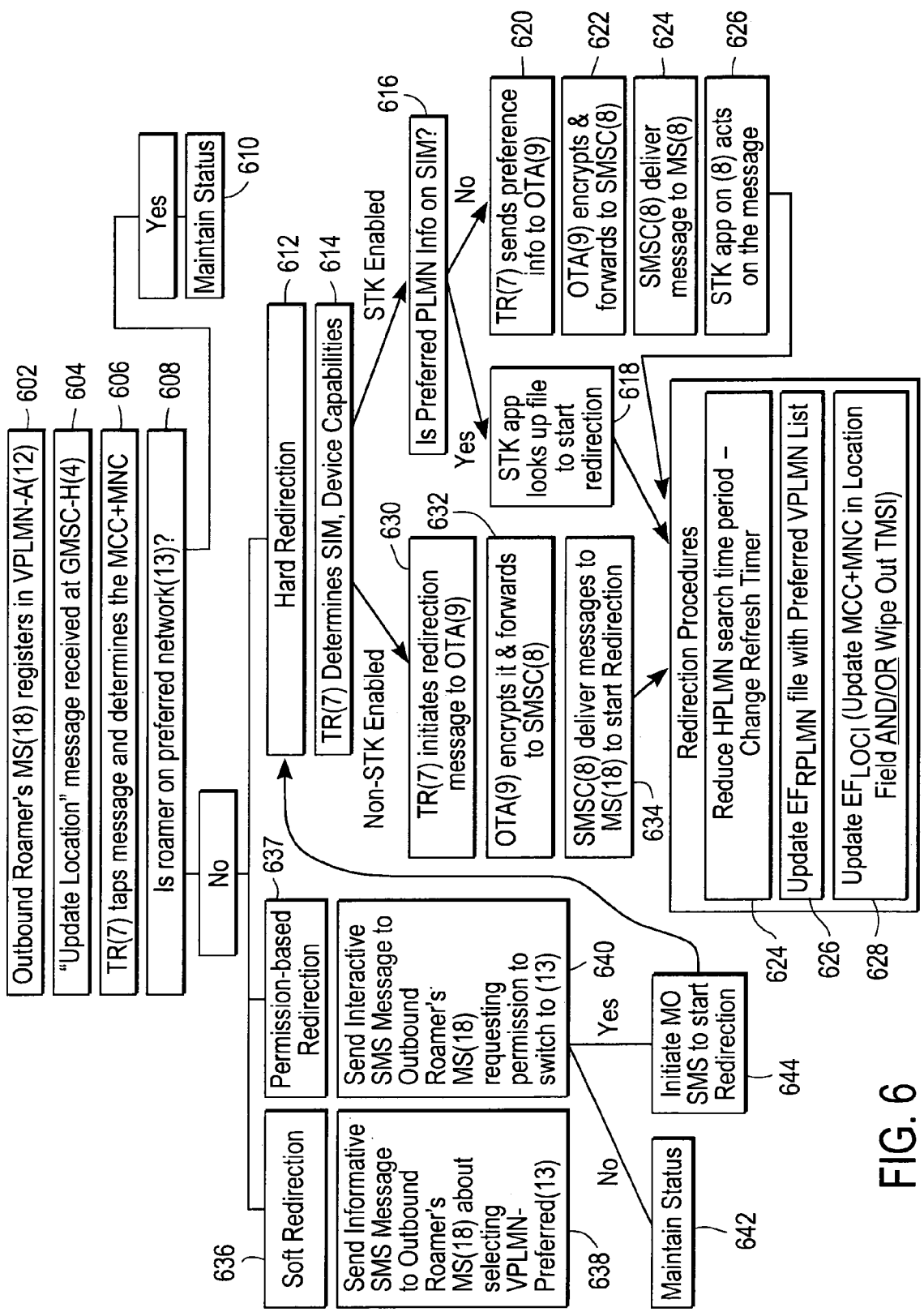
FIG. 6 is a flow diagram of an embodiment of OTA traffic redirection.

FIG. 6 is a flow diagram of an embodiment of OTA traffic redirection, which will now be described with reference to FIGS. 5 and 6.

As shown in block 602, the roaming mobile station 204 registers on VPLMN 506 via the base station 205 and an MSC/VLR 512. An "Update Location" message is then generated by the MSC/VLR 512 at 604.

The TR network element 102 monitors the external roaming links 514 for "Update Location" messages. Monitoring can be done actively or passively, as previously described, depending on the operator requirements. If monitoring is passive, the TR node 102b of the TR element 102 is a passive probe. If the VPMN information is gleaned from the signaling path, then the TR node 102b of the TR element 102 is an active SS7 element and SCCP relay.

As soon as TR network element 102 taps the "Update Location" message at 606, it determines the MCC and MNC codes from this message, which enables it to identify the country and the VPLMN on which its roaming mobile station 204 has registered. At 608, using the various databases including the preferred partner list database, the TR network element 102 determines if the current VPLMN is a preferred network.

If the current VPLMN is a preferred partner network, no further action is taken, and the status is maintained, as shown at 610. If the current VPLMN is not a preferred partner network, then the TR network element 102 initiates a redirection process. Depending on several factors, such as the choice of operator-HPLMN and associated business rules, the TR network element 102 initiates one of several traffic redirection processes.

Referring first to soft redirection 636, the TR network element 102 sends a SMS message to the roaming mobile station 204 via the SMSC 106, informing the outbound roamer 202 that she would benefit from economical roaming rates and value-added services if she manually switches to the HPLMN 212 preferred partner network, VPLMN-Preferred 504. This is shown at 638. This message can further provide short steps on how the user 202 can manually switch to the preferred network 504. Additionally, the TR network element 102 can personalize these steps for the specific device 204, by using its handset capabilities database. The user 202 may follow the suggested steps and switch to the VPLMN-Preferred network 504.

In the case of permission based redirection 637, the TR network element 102 sends an interactive SMS message 640 to the roaming mobile station 204 via the SMSC 106, informing the outbound roamer 202 of the benefits of switching to the preferred VPLMN-preferred network 504. This interactive message further gives the roamer an option to respond with a "Y" or "N" to this request. If the roamer 202 responds with "N", then no action is taken, the status does not change, as shown at 642, and the roamer 202 continues on the VPLMN-A network 506. If the roamer 202 responds with "Y", then the TR network element 102 initiates the redirection process at 604. From this point, the process is similar to hard redirection, as described below.

In the case of hard redirection 612, the TR network element 102 looks up the SIM/Device capabilities database to determine if the roaming mobile station 204 is STK enabled or not, as shown at 614. Alternatively (not shown), the OTA server can also be used to query the SIM for contents of the $EF_{PHASE}$ (GSM Phase Information file). The value determines the phase of the SIM. A value of 00 indicates Phase 1 SIM while a value of 02 indicates Phase 2 SIM. Any other value of 03 or higher indicates that at the very minimum Phase 2 capabilities are supported.

If the mobile station 204 is non-STK enabled, then the TR network element 102 initiates a redirection message with the necessary data to the OTA server 112 at 630. The OTA server 112 encrypts this message at 632 and forwards it to the SMSC 106 for delivery to the roaming mobile station 204 at 634.

If the mobile station 204 is STK-enabled, then the TR network element 102 determines at 616 whether preferred PLMN information is available on the mobile station 204 SIM. If the preferred PLMN information is not available, the TR network element 102 sends preference information to the SIM at 620. The OTA server 112 encrypts the information and sends it to the SMSC 106 at 621. The SMSC 106 delivers a message to the mobile station 204 at 622, and at 623 the STK application 280 acts on the message.

If the preferred PLMN information is available, the STK application on the mobile station 204 looks up the preferred PLMN information file and begins redirection at 618.

Redirection includes using the OTA server 112 to update certain SIM card files. As shown at 624, the SIM files are updated to reduce an HPLMN search timer period in $EF_{HPLMN}$ from a default value to a value "01" as specified in ETSI GSM 11.11. This specifies that the mobile station will search for the HPMN after 6 minutes. If the redirection attempt is not successful (within next 6+delta minutes), redirection will be re-attempted for a configurable number of times. If the attempt is still not successful or if the mobile station switched to the preferred network, the search period specified in $EF_{HPLMN}$ will be restored to the default value at the discretion of the HPMN. This search time reduction may be required on some handsets to trigger a search for the HPLMN and in the process force an Update Location procedure as defined in ETSI GSM 2.11, 4.08, 3.22 and 3G TS 23.122.

As shown at 626, the $EF_{PLMNSEL}$ file (PLMN Selector file) is updated with a list of preferred partners. The preferred partners can be derived based on application logic (group network, partner network, favorable inter-operator tariff (IOT) rates, network offering services most used by the out-roamer, roaming traffic commitments etc.). The most preferred network should be the first network in the list followed by the next preferred partner etc. The information stored is essentially the MCC and MNC code for the networks in that geographic area.

For some SIM cards, it is necessary to delete the information stored in $EF_{BCCH}$ (Broadcast Control Channels) or to read it and re-order some of the cell information such that the cells are arranged in decreasing priority order of the preferred networks (most preferred network cell is ordered first). The BCCH information is derived from the System Information 2 message and the Neighbor Cells Description Information Element as specified in ETSI GSM 4.08, 11.11 and 3G TS 23.122.

As shown at 628, the $EF_{LOCI}$ (Location Information File) is updated with the following information:

set MCC and MNC in LAI to the most preferred network; and for some SIM and handset combinations, erase the Temporary Mobile Subscriber Identity) TMSI value.

For some SIM and handsets combinations, the Location Update Status field is set to "Not Updated". This forces an Update Location to the MCC and MNC set in the Location Area Identifier (LAI) field.

For some SIM and handset combinations, the $EF_{FPLMN}$ is set to the currently selected non-preferred network.

If the mobile station 204 detects these changes automatically, it performs a new Update Location on the MCC and MNC updated by the TR network element 102. In other cases, the handset should be instructed to refresh its cache. This is performed using an OTA initiated REFRESH, a SIM toolkit application initiated proactive REFRESH command, or a WIB REFRESH (if the SIM card supports it).

If the signal strength from the preferred network is strong enough, the mobile station 204 will be able to successfully register.

This completes the redirection procedure and the roaming mobile station 204 is switched to the VPLMN-Preferred network 504.

RUN AT Command Based Traffic Redirection

This section describes an alternative to the previously described OTA approach for traffic redirection. If the handset is letter class "b" compliant (which means it supports the RUN AT proactive SIM command) and if the RUN AT service (service number 42 in $EF_{SST}$ on the SIM card) is activated and allocated, then a SIM toolkit application or WIB application can issue a RUN AT+COPS command to select a specific network. On some SIM cards, it may also be possible to use proprietary mechanisms to invoke the RUN AT command via the OTA server.

Registration Rejection Traffic Redirection

Embodiments of registration rejection traffic redirection involve rejecting the first round of Update Location messages when the handset is trying to register on the VPMN, so that the handset starts searching for a new network. Various ways to achieve this are described below.

Registration Rejection Traffic Redirection—Aborting the Update Location Transaction Referring again to FIG. 4, note that in a passive monitoring mode, the link 402 is a monitored link while the link 404 is an active link into the SS7 network 306. In an active mode, both links 402 and 404 are active links into the SS7 network, and the TR network element 102 is the signaling path. When the mobile station 204 registers in the VLPMN 208, the VLR 312 first requests authentication information from the HPLMN 212 of the roamer 202. This is to make sure that the roamer 202 is an authentic subscriber and is allowed to get service on the registration rejection on a roaming relationship between the VPLMN 208 and the HPLMN 212. This authentication request is in the form of a MAP message that is sent on the SS7 signaling link 314. The specific MAP message depends on the MAP version being supported, but is typically one of SEND AUTHENTICATION INFO, or SEND PARAMETERS. Once the response from the HLR 302 is received by the VLR 312, the MSC 312 accepts the Update Location message from the mobile station 204 and routes it to the HLR 302 in HPLMN 212 via the inter-operator SS7 signaling link 314.

The TR network element 102 detects the Update Location Request, and if the subscriber is on a non-preferred network, it sends an Update Location End response on the SS7 link 314 with a message such as cause System Failure, Unexpected Data Value or Data Missing. The Global Title of the sending entity does not make a difference and it could either be the same as the HLR 302 or a different one.

The transaction can be aborted at the TCAP layer. In order to do this, the dialog of the original transaction is used and the Update Location End response message is sent on the SS7 link 314 to the VLR 312.

Each of the processes described above can be performed using passive monitoring or by being in the signaling path (active monitoring). The TR node 102b uses a valid Global Title and Point Code to inject these messages into the SS7 network 306.

Figure 7:
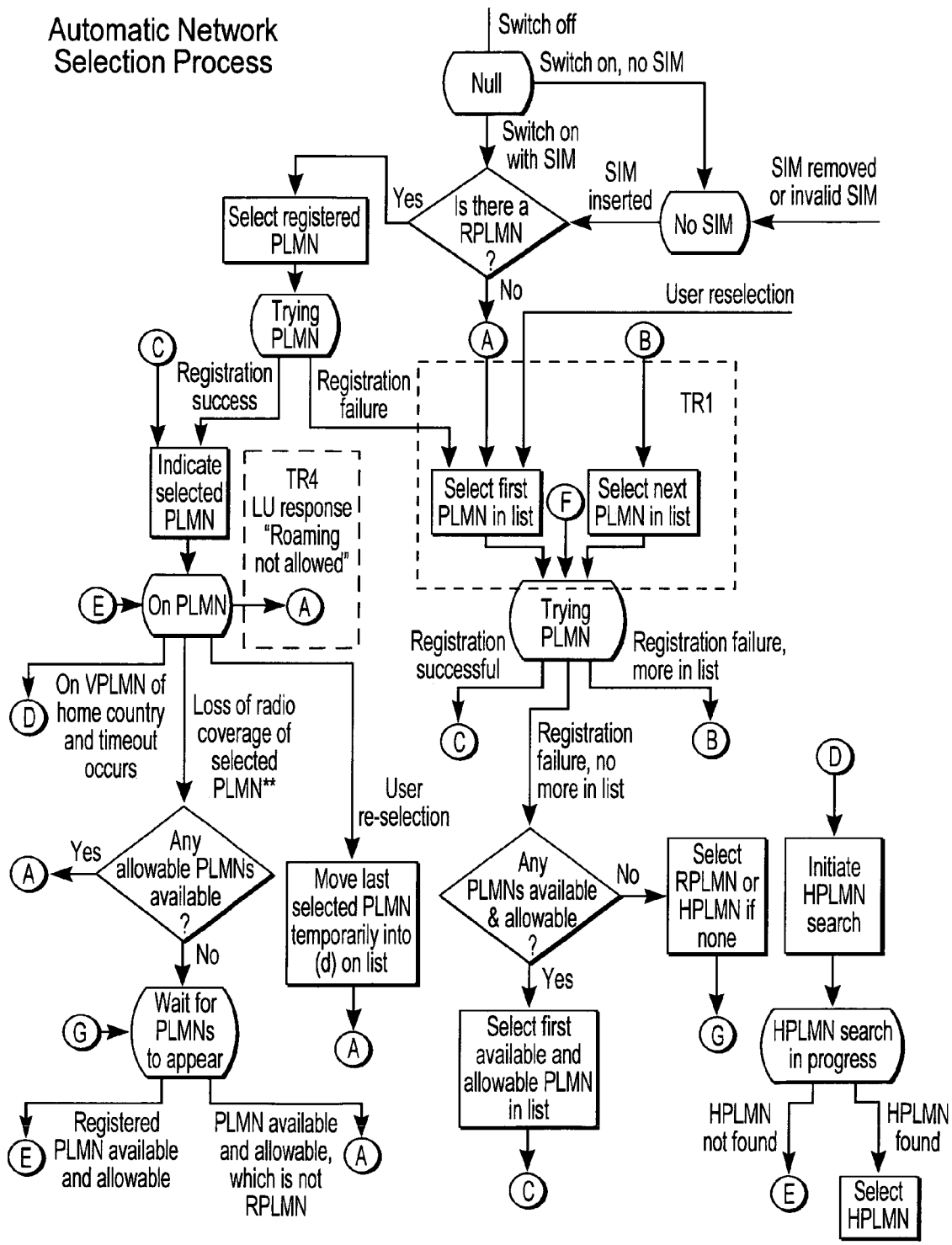
FIG. 7 is a flow diagram illustrating the interaction of an embodiment of traffic redirection with automatic network selection.
Figure 8:
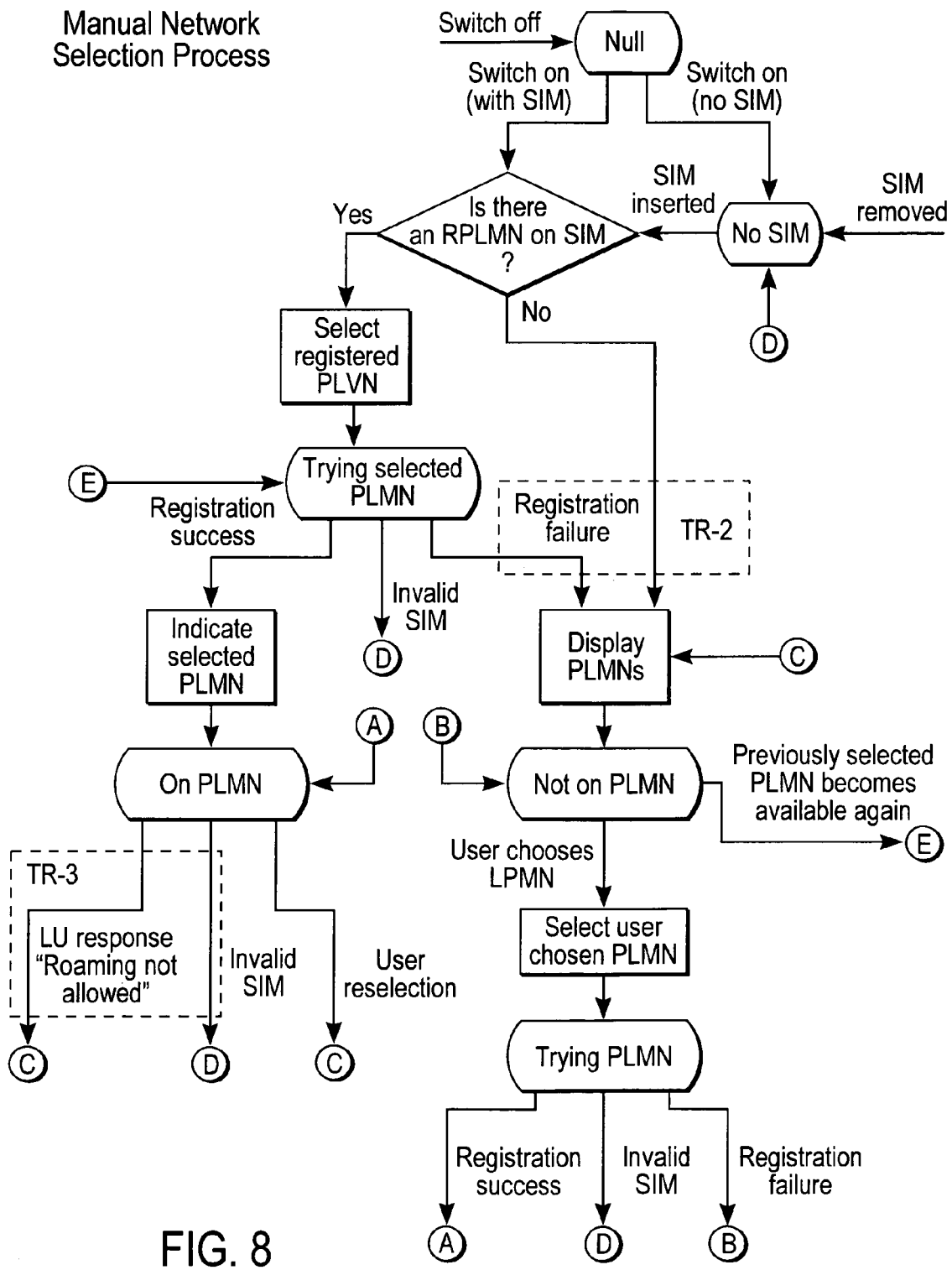
FIG. 8 is a flow diagram illustrating the interaction of an embodiment of traffic redirection with manual network selection.

The handset 204 tries the Update Location on the same network a few more times. This attempt count is equal to the value of the ATTEMPT COUNTER (recommended as 4 in GSM specifications). If there are as many consecutive failures, the handset 204 searches for a new PLMN. In effect, it goes to the box marked as TR1 in FIG. 7 (Automatic network selection mode) or the box marked as TR2 in FIG. 8 (Manual network selection mode). FIGS. 7 and 8 are diagrams showing an automatic network selection process and a manual network selection process, respectively, per the specification 3G TS 23.122 Version 3.1.0 Release 199 (ETSI TS 123 122 V3.1.0 2000–01). As referred to herein, FIGS. 7 and 8 show how various embodiments interact with the specified processes.

The Update Location message is routed to the HLR 302 in the HPMN 212 of the roamer. The TR roaming probe 102a monitors the MAP messages on the international roaming links. The TR application 102c of the TR network element 102 receives the Update Location event since it has previously registered with the probe for this event notification.

The TR application 102c checks its database information and decides if a traffic redirection has to be attempted. For example, if the roamer has registered on a non-preferred VPMN, the traffic redirection application may decide to perform some actions. Other, more specific logic can also be programmed to identify a candidate for traffic redirection. For example, preferred networks for pre-paid and post-paid users, or for GPRS and non-GPRS users may each differently influence whether to redirect.

The traffic redirection application rejects the "first round" of Location Updates and thereby forces the handset to search for the next available PLMN (in automatic roaming network selection mode) or try the same PLMN after a brief delay (in manual roaming network selection mode, or if only one network is available in automatic roaming mode). The "first round" of Update Location is "rejected" by jamming the transaction. In one embodiment, jamming the transaction involves sending a spurious MAP End Update Location message with a configurable user error. In one embodiment, the user error is one of System Failure (local value 34), Data Missing (local value 35) or Unexpected Data Value (local value 36).

Other possible values include Unknown Subscriber (local value 1), and Roaming Not Allowed (local value 8). These values, however, can cause various significant events. For example, Unknown subscriber translates to "IMSI not known in HLR" on the radio interface and this marks the SIM as an invalid SIM. The handset stops further PLMN search unless the SIM is removed and reinserted or the handset is powered off and on. "Roaming Not Allowed" puts the PLMN in the Forbidden PLMN file ($EF_{FPLMN}$) in non-volatile memory on the SIM card and the network cannot be selected unless removed by an OTA operation, STK application, or manual network selection. This value is probably not useful unless the partner network in VPMN country has national coverage or there is a roaming relationship with at least three operators in the visited country.

Figure 9:
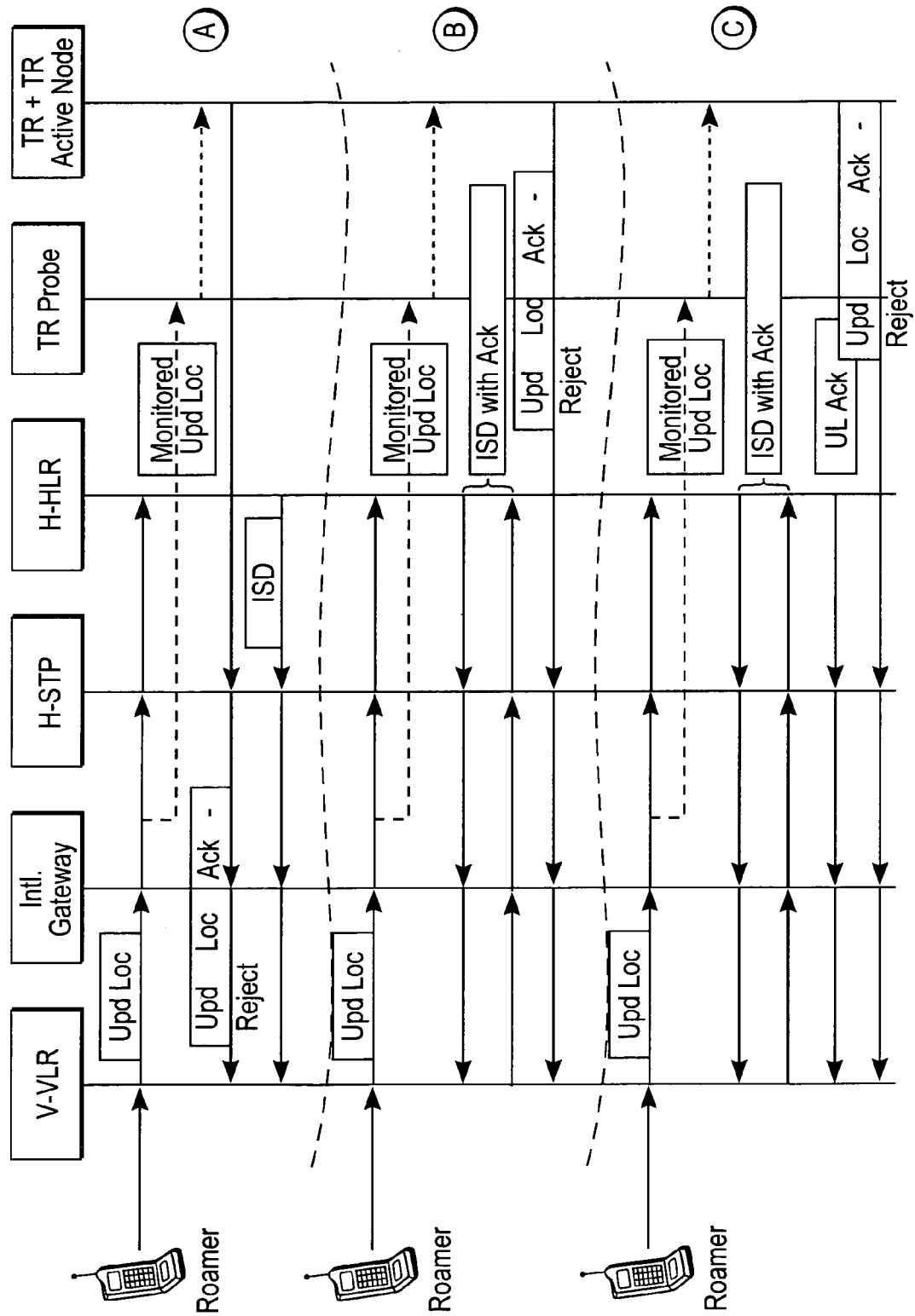
FIG. 9 is a diagram of a call flow according to one traffic redirection embodiment.

The HLR has to send at least one and in many cases two or three Insert Subscriber Data messages to the VLR. Therefore, its transaction time would be greater than that taken by the TR application 102c to send the End Update Location. In most cases, there are two ISD messages for post-paid and three ISD messages for most pre-paid subscribers. The time between receiving an Update Location to sending an End Update Location is between 2–3 seconds. Referring to FIG. 9, the three call flow cases (A), (B) and (C) should be evaluated in this context. If the VLR sees an End Update Location message from the TR application 102c before it sees one from the HLR, it will abort the transaction and reject subsequent messages (including any pending ISD or End UL from HLR). This is shown in call flow (A).

It is also possible for the HLR manages to send the ISD message; however the TR application 102c Update Location Reject message arrives before the UL Ack from the HLR, and the Update Location transaction is aborted. This case is shown in call flow (B).

Call flow (C) shows the case in which the HLR manages to successfully send its data and close the transaction before the TR application 102c message reaches the VLR. In this case, the second End Update Location from the TR application 102c will be rejected and the out-roamer will manage to register successfully on the non-preferred network.

In each of call flows A, B, and C if the roamer handset is in manual mode, it will retry the Update Location on the same network automatically or show the list of available networks to the roamer to choose from. If the handset was in automatic roaming mode, it will try to register on another PLMN if one is available. Else, it will reattempt an Update Location on the same network.

In one embodiment, the TR network element introduces random event based delays before trying to abort the transaction. The delays help "hide" the Traffic Redirection attempts from VPMN since the UL attempts will get blocked at different levels—sometimes before the first ISD; sometimes after the first ISD. In some cases, no traffic redirection attempt will be made. Additional information elements like Subscription class (enterprise, consumer), average spending etc. can also be used to make these decisions.

The timers that define how long the mobile station waits before reattempting the Update Location are defined in GSM 04.08. According to those specifications, the mobile station waits 15 seconds (the value of timer T3211) after receiving an Update Location reject or an abort at the TCAP layer of the transaction.

Registration Rejection Traffic Redirection—Aborting the Send Authentication Information Transaction Referring again to FIG. 4, in a passive monitoring mode, link 402 is a monitored link while link 404 is an active link into the SS7 network 306. In an active mode, the TR network element 102 is in an active signaling path and the signals are carried by the active SS7 links 402 and 404.

When the mobile station 204 registers in the VLPMN 308, the VLR 312 first requests authentication information from the HLPMN 212 of the roamer 202. This is to make sure that the roamer is an authentic subscriber and is allowed to get service on the registration rejection on roaming relationship between the VLPMN 208 and the HLPMN 212. This authentication request is in the form of a MAP message that is sent on the SS7 signaling link 314. The specific MAP message depends on the MAP version being supported but is one of SEND AUTHENTICATION INFO, or SEND PARAMETERS.

The TR network element 102 detects the Send Authentication Info or Send Parameters message and if the subscriber is on a non-preferred network, it sends the End response on the SS7 link 314 with a cause System Failure, Unexpected Data Value or Data Missing message. The Global Title of the sending entity does not make a difference and it could either be the same as the HLR 302 or a different one.

In order to abort the transaction at the TCAP layer, the original transaction is used, and the End response is sent on the SS7 link 314 to the VLR 312.

Each of the above can be performed using passive monitoring or active monitoring. This case is similar to the Update Location Abort case described earlier; however, it makes sense to do this while in the active signaling path since the transaction time is much smaller than that of the Update Location. The TR node 102b needs a valid Global Title and Point Code in order to inject these messages into the SS7 network 306.

The handset 204 tries to authenticate itself on the same network a few more times. This attempt count is equal to the value of the ATTEMPT COUNTER (recommended as 4 in GSM specifications). If there are as many consecutive failures, the handset searches for a new PLMN. In essence it goes to the box marked as TR1 in FIG. 7 (Automatic network selection mode) or the box marked as TR2 in FIG. 8 (Manual network selection mode).

Registration Rejection Traffic Redirection—Timing Out the Response to Send Authentication Information Message This case is similar to Aborting the Send Authentication Information message. The difference is that instead of aborting the transaction, the TR node 102b of the TR network element 102 does not send any response to the VLR 312. This forces the mobile station 204 to rescan the network as per procedures described in FIGS. 7 and 8.

Registration Rejection Traffic Redirection—Timing Out the Response to Update Location Message This case is similar to timing out the Send Authentication Information message. The difference is that Send Authentication Information is allowed to go through but the Update Location is not. The TR network element 102 does not send any response to the VLR 312. This forces the mobile station 204 to rescan the network as per procedures described in FIGS. 7 and 8.

Registration Rejection Traffic Redirection—Modifying the Insert Subscriber Data Message with "Roaming Restriction Due to Unsupported Feature"

Referring again to FIG. 4, this approach is effective when the TR network element 102 is in the active signaling path 404. On receipt of an Update Location request from the VLR 312, the TR network element 102 can send or modify the framed Insert Subscriber Data Message from the HLR 302 to the VLR 312 with the flag "Roaming Restriction due to unsupported feature". Subsequently, the Update Location transaction is allowed to complete normally. This allows the registration to succeed in the VLR 312, but the VLR 312 sends a "Roaming not allowed in this Location Area" code to the mobile station 204 via the MSC 312. When the mobile station 204 receives this response code, it starts searching for a new PLMN. This is shown in block TR3 of FIG. 8 and block TR4 of FIG. 7. If no PLMN is found, the mobile station 204 stays on the current VLR/MSC 312 area and only allows emergency calls to go through.

Unlike the "Forbidden PLMN" information which is in non-volatile storage on the SIM card, this information is stored on the handset memory and is erased when the subscriber roams into a different location area of the same network, switches the phone off, manually selects the network again, or the restriction is removed from the VLR. Specifications also recommend that this list be erased every 12 or 24 hours.

If the handset is in automatic mode and another network is available, the handset will attempt registration on that network quickly. The TR network element 102 recognizes this and allows/rejects the registration again. However, if the handset is in manual mode or no network was available in automatic mode, it will not attempt a registration quickly. In such a case, the TR network element 102 withdraws the roaming restriction using MAP DELETE SUBSCRIBER DATA (ref GSM 09.02). Therefore, subsequent registrations will be allowed.

Handling Special Cases

Special handling is required in certain cases for both international and national roaming. These require certain variations to the approaches described before, and take care of situations such as, for example:

identifying whether the out-roamer is in the middle of a call or a GPRS/MMS session;

invoking the Update Location on demand so that an attempt to move the out-roamer from a non-preferred network to a preferred network can be made;

identifying whether the out-roamer handset is in manual or automatic network selection mode; and identifying an exact location area for national roaming in which coverage may have to be provided on a more restrictive geographical basis.

These cases are discussed in the following sections. In addition, mechanisms to handle VLR and HLR failures and GPRS sessions in progress are also described.

Identifying a Roamer within a MO or MT call: SIM Toolkit Approach

The SIM Toolkit application registers for Event Download on Call Connected and Call Disconnected events. On a MO or MT call, these events are delivered to the SIM toolkit application. The application can hence make sure that it performs the traffic redirection when the mobile station is in idle mode.

Identifying a Roamer within a MO or MT call: Update Location Reject Approach

As per specifications, an Update Location is sent only in the following cases:

a) mobile station requests an Update Location at registration;

b) mobile station requests an Update Location due to expiration of Periodic Update Location Timer;

c) the GSM subscriber moves between two VLR areas. If a VLR handles more than one MSC, then the UL is sent when the subscriber moves to another MSC handled by the second VLR. However, if the subscriber moves between MSC handled by the first VLR, no Update Location is sent;

d) the GSM subscriber moves between two different networks. In this case, the call drops today. However, there are some operators (few and far between) who have arrangements to hand-over the call between their networks; and e) in the case of VLR or HLR failure: if the VLR fails, it invokes a Restore Data to which the HLR responds with Insert Subscriber Data. If HLR fails, it sends a Reset Data message to which the VLR responds with Restore Data.

The GSM specification (ETSI TS 100 527; GSM 03.09 v7.0.0) also provides information on the call handover procedures. If the subscriber is in midst of a call, an Update Location is not sent to the HPMN for cases b) and c). For case d), if the call is dropped, a new registration process in the second network initiates an Update Location transaction. If the network just hands over the call to another MSC, no new UL is sent. This happens because the original VLR/MSC still retains call control and just the radio part is handed over. The second VLR gets the subscriber information from the earlier VLR.

Since the Traffic Redirection network element blocks the Update Location messages, this implies that if the subscriber is in the midst of a call, there will be no location update and hence there will be no affect on Quality of Service to the subscriber.

Identifying Manual/Automatic Network Selection Mode: SIM Toolkit Approach

If the SIM has RUN AT service (service number 42 in $EF_{SST}$) activated and allocated and the handset supports the RUN AT proactive SIM command (as most letter class "b" handsets do), the SIM Toolkit application can issue the RUN AT+COPS? in order to detect the handset mode.

Identifying Manual/Automatic Network Selection Mode: Update Location Reject Approach This approach heuristically detects the handset mode from the SS7 signaling. If the TR network element detects more than four Update Location transactions on the same network, it assumes that the handset is in manual network selection mode. This is because the ATTEMPT COUNTER value is specified to be four.

Another mechanism to detect the manual network selection mode is detecting when the handset does not perform a new Update Location on a different network within 20 seconds of the previous Update Location that was rejected.

Initiating Update Location on Demand From HPMN

There can also be situations where the HPMN will want more active control on the outbound roamer. Normally the Update Locations are received when the roamer moves from one VLR to another, or when they switch VPMNs. However, if the roamer remains static in a VLR area (which could handle multiple MSC), no Update Location will be sent unless triggered by the Periodic Location Update Timer (with a random value typically in hours).

Figure 10:
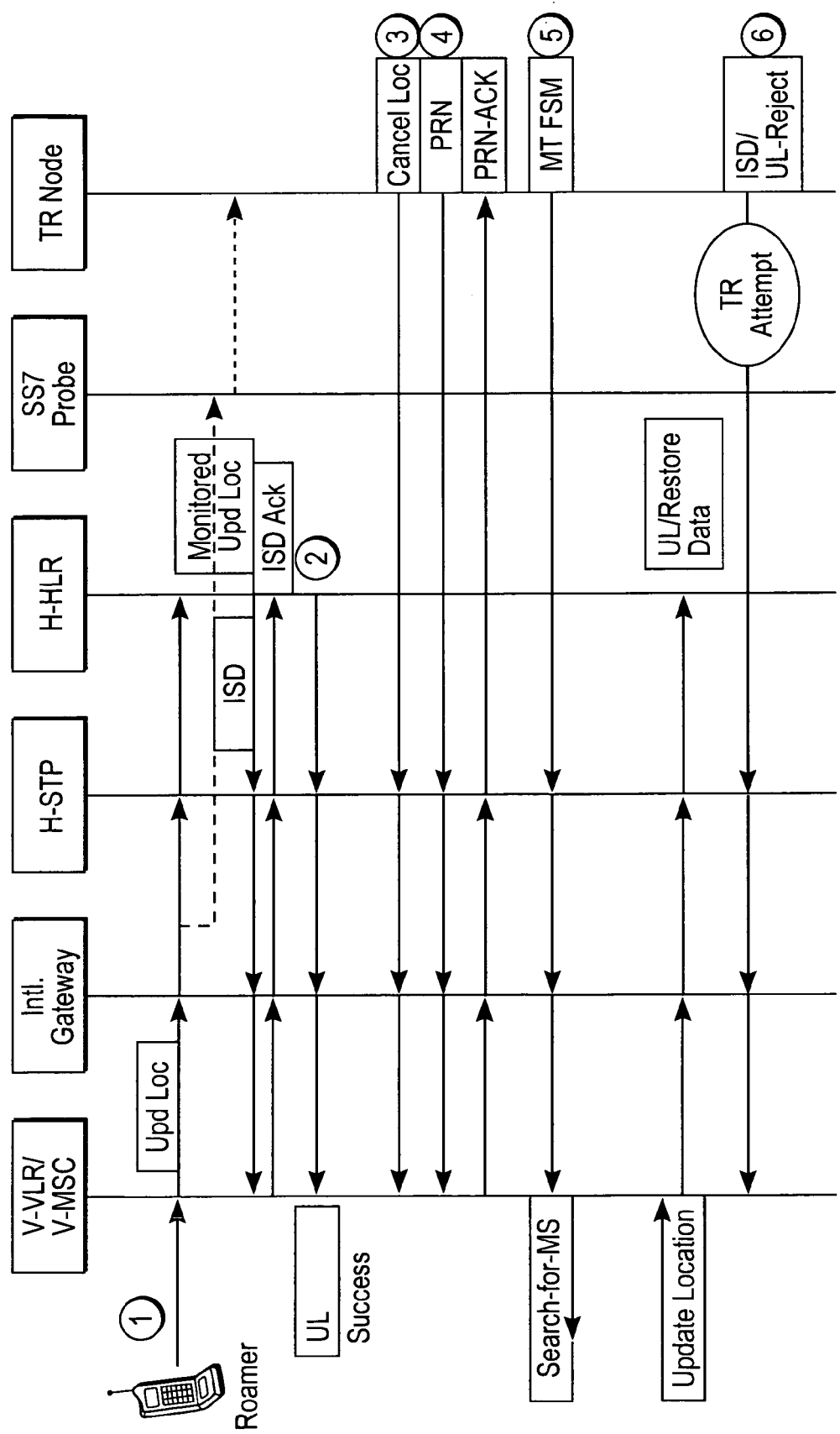
FIG. 10 is a diagram of a call flow according to one traffic redirection embodiment.

The TR network element can initiate an Update Location from the mobile even when the roamer does not move. With reference to FIG. 10, the roamer initiates an Update Location from the VLR to the HLR. This is identified by step 1. Subsequently the HLR sends the Insert Subscriber Data message and the Location Registration is complete. However, since this roamer is on a non-preferred network, the HPMN may want to move the subscriber to the preferred network at some point in time (nighttime, for example). In one embodiment, this is accomplished by sending a MAP-CANCEL-Location message to the VLR. This is identified in Step 3. This marks the record as deleted in the VPMN VLR. Next, the TR network element sends a MAP Provide Roaming Number message to the same VPMN VLR to which the Cancel Location was sent earlier in Step 3. The specifications (GSM 09.02 Fault Recovery section 19.3) state that on receipt of a PRN message for an IMSI which does not exist, the VLR will create a dummy record for the IMSI, mark the "Confirmed in HLR Flag" as "Not Confirmed" and also mark the "Confirmed by Radio contact Flag" as "Not confirmed". The VLR will also return the MSRN number to the requester. The PRN transaction is identified as Step 4. On receipt of an incoming call or SMS, the VLR instructs the MSC to page the IMSI in all its location areas. This paging establishes radio contact and when successful, forces the mobile to initiate a fresh Update Location/Restore Data procedure. This forces the HLR to resend the subscriber profile via the ISD message. The monitoring probe can now follow the original TR approach of Rejecting Update Location. These steps are marked as Steps 5 and 6.

Handling MAP_RESTORE_DATA during VLR Failure

When the VLR starts its recovery procedure after a failure, it marks the "Confirmed in HLR" flag as "Not Confirmed". Subsequently, when the VLR receives incoming calls or SMS for IMSI for which the status is not set to "Confirmed", it will initiate a Restore Data or Update Location message to the HLR. The SS7 monitoring probe and the TR application 102c will see a big surge in messages. The TR network element will try to move as many out-roamers to partner networks as it can. However, if there is more traffic than can be handled by the TR network element, this does not create a problem since in the worst case, some roamers will continue to be on the non-preferred network until they perform a new Update Location by virtue of moving, or Periodic Location Updating (PLU) Timer, or as a result of induced Update Location as described previously.

Handling MAP_RESTORE_DATA during HLR Failure

When the HLR starts its recovery procedure after a failure, it sends a MAP_RESET_DATA message with leading indicators of IMSI values handled by it. This causes the VLR to mark the "Confirmed in HLR" flag to "Not Confirmed". Subsequent PRN requests and incoming/outgoing calls will initiate Restore Data/Update Location from the VLR to the HLR. For both the approaches just discussed above, depending on business logic, these restoration attempts could be treated as potential TR candidates (since the partner network has anyways lost information!) or left alone. This may impose a short peak load on the probes and TR network element; however that load is short lived and in the worst case, some mobiles will not undergo the TR treatment. There will be no other side effect.

Handling Active GPRS Subscribers

There should not be any affect on GPRS roaming subscribers since those updates are normally independent of the normal Update Location and performed using MAP_UPDATE_GPRS_LOCATION from SGSN to HLR (ref GSM 09.02 and GSM 04.08).

National Roaming

Some special handling may be required to handle the case of national roaming. As an example, in the international case, the TR network element is interested in which country the handset is in. In the national case, roaming can occur among many networks in large countries like the United States and Canada. In the national case, the TR network entity is interested in the current Location Area of the handset. This is due to the fact that in some areas, both the HPMN and VPMN may offer service while in other areas only the VPMN may offer service. In some countries, the HPMN may also want to bar their subscriber from using a particular VPMN in some specific regions. Note that in such cases, the decision of which network to keep the roamer on cannot be determined just by looking at the VLR address in the Update Location transaction. Finer granularity at a cell-id or Location Area level is required.

Figure 11:
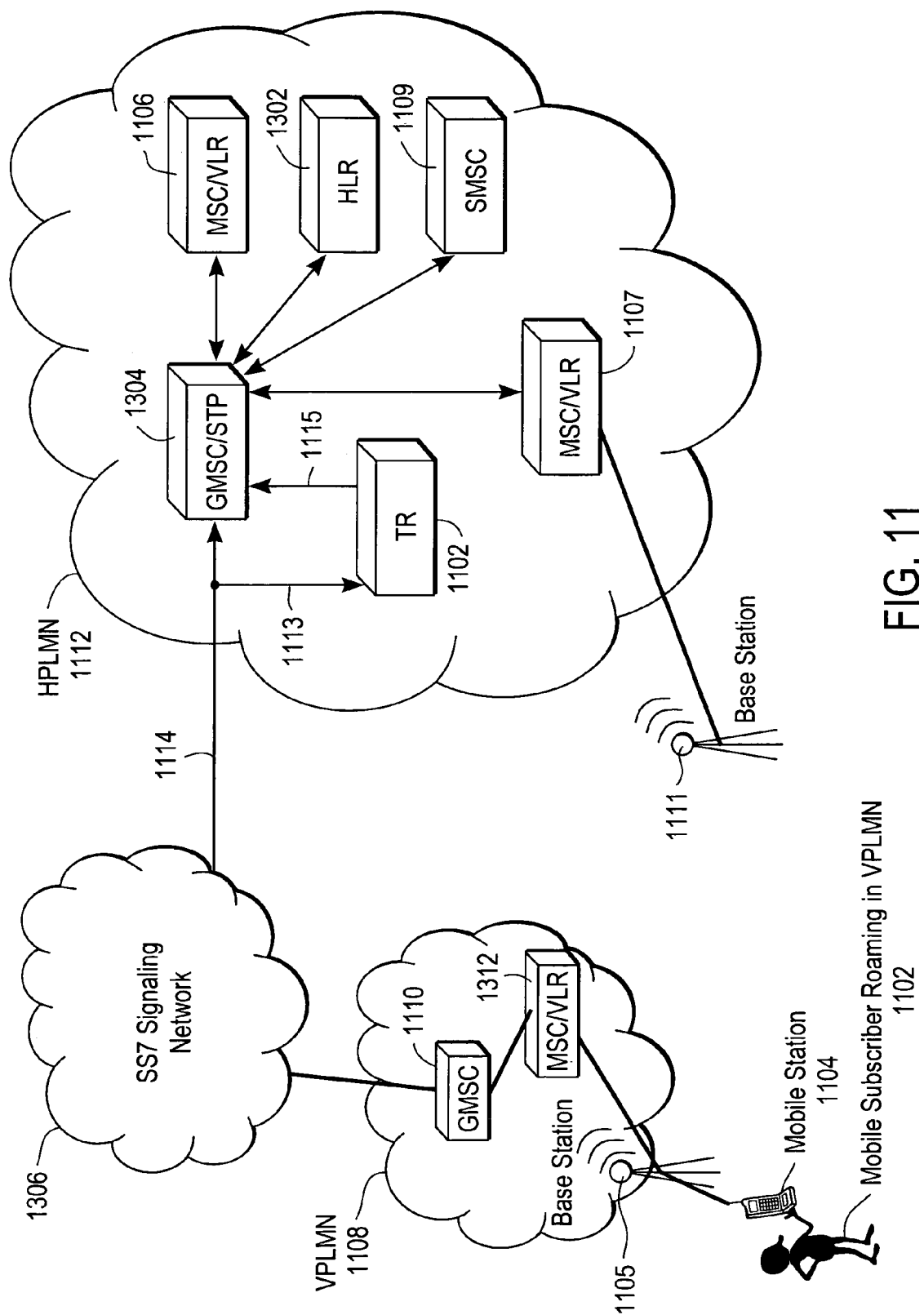
FIG. 11 is a block diagram of an embodiment of a traffic redirection system with national or border roaming and traffic redirection.

FIG. 11 illustrates a case in which the mobile subscriber 1102 could potentially get coverage from the VPLMN 1108 base station 1105, and the HPLMN 1112 base station 1111). The HPLMN 1112 operator might want to allow the mobile station 1104 to roam onto VPLMN 1108 in some areas and in other areas either deny the service or try to proactively move the roamer to the HPLMN 11 12 coverage area. In such a case, the granularity may be the Cell-id. Note that each base station has multiple cells and the cell-id is not sent to the HPLMN 1112 in the Update Location transaction.

In one embodiment the mechanism of doing this includes selective redirection. The TR network entity stays in the SS7 signaling path 1114 and manipulates the Update Location transaction. Again with reference to FIG. 11, the mobile subscriber 1102 is roaming in VPLMN 1108, and initiates the registration process on the network. The Update Location message is routed from the VPLMN 1108 to HPLMN 1112 where the message is routed via the TR network element 102 to the HLR 1302. The HLR 1302 sends the subscriber profile to the VLR 1312 using the Insert Subscriber Data message. This message is routed via the TR network element 102. TR network element 102 modifies the Subscriber Status in the message to "Operator Determined Barring". This allows the mobile station 1104 to register, but does not allow the subscriber 1102 to make or receive any calls. Immediately afterwards the TR network element 102 sends a MAP Provide Subscriber Information message to the VLR 1312. The VLR 1312 returns the cell-id of the mobile station 1104 gathered during the Update Location Area transaction. Based on this cell-id information, the HPLMIN 1112 may decide if it wants the roamer to register on this network (for example, when HPLMN 1112 does not offer service in that specific region) or search for another network (for example, if the roamer is in or close to an area where the HPLMN 1112 also offers service).

Should the subscriber be denied service, the TR network element 102 issues a MAP Cancel Location command to the VLR 1312 and subsequently sends a MAP Forward MT-SMS message using SMS protocol id 40 to force the mobile station 1104 to acknowledge the SMS without showing the content to the subscriber 1102. In some cases, the instead of sending the SMS using a MAP command, The SMS can be sent via the HPMN SMSC 1109. This forces the VLR 1312 to issue a Search MS command to the MSC/VLR 1312 and hence establish radio contact with the mobile station 1104.

An alternative is to send a MAP Provide Roaming Number request to the VLR 1312. Because the roamer record was previously cancelled using Cancel Location, the VLR 1312 creates a dummy record; allocates a MSRN, and sets the status of the dummy record as "Confirmed in HLR" and "Not confirmed by radio contact". On a subsequent incoming call, this results in a MAP Restore Data message from the VLR 1312 to the HLR 1302 to retrieve the, profile. The TR network element 102 sends the Insert Subscriber Data message with "Roaming restriction due to unsupported feature" in order to make the mobile station 1104 search for a new network. In this case if the subscriber 1102 moves and the mobile station 1104 sees the HP LMN 1112 cell-id covered by base station 1111, then the mobile station attempts registration on the HP LMN 1112 and this is allowed to go through.

If the subscriber should be provided service in the original location area covered by VPMN 1108 base station 1105, a similar approach is followed except that the "Roaming Restriction due to unsupported feature" flag is not set and the Subscriber Status flag is also not modified. This allows the subscriber to register properly and get service.

Note that for national roaming, it is recommended that the $EF_{HPLMN}$ value on the SIM card be set to 1. This will make the handset search for the HPLMN every 6 minutes. Hence if a subscriber was granted service in a VPLMN and subsequently moves to another area where the HPLMN also has coverage, the maximum time before the HPLMN is selected will be 6 minutes.

In addition, some operators may chose to not use Cancel Location in the approach mentioned above; however they may send a Standalone Insert Subscriber Data message and abort it. This approach has similar end result with the advantage that existing calls in progress will not be affected.

Application Using the Traffic Redirection Embodiments

Various applications can be built on top of the core technology to redirect users onto a specific network. Some of these are as follows:

Application Using the Traffic Redirection Embodiments: Border Roaming Gateway

In many countries, especially with land borders, there is coverage from networks of the bordering countries. A similar situation arises in national roaming case when within a country, the HPMN and the VPMN offer roaming in some overlapping coverage areas. In such a case, the people at the border continuously "hop-on" and "hop-off" the HPLMN network. The approach of rejecting the Update Location on the roaming network and bringing them back onto the HPLMN network can save lot of money for the mobile operators and also provide good customer service to their subscribers since the subscribers do not have to pay roaming charges.

Application Using the Traffic Redirection Embodiments:
Menu/SMS Based User Permission for TR Mobile operators can offer various kinds of Menu based services to the roamers in order to select the correct network. Some of these selections can be influenced by:

providing information to the roamer on the roaming tariff applicable on various roaming partner networks, billing pulse duration, minimum charges etc.;

providing information to the roamer on who is the partner network in that country and what services do the various networks offer. For example, network 1 may offer only voice roaming but network 2 may offer voice and GPRS; and providing information on partner networks in the country and on which user could earn rewards etc.

What is claimed is:

1. A system for directing roaming network traffic, the system comprising:
a Home Public Mobile Network (HPLMN) that is a home network of a mobile station;
a Visited Public Mobile Network (VPLMN) configured to communicate with the HPLMN via a signaling network, wherein the mobile station is roaming when in the VPLMN; and
a traffic redirection node comprising high impedance probes on SS7 links between the HPLMN and the VPLMN, wherein the traffic redirection node is configured to monitor signaling between the HPLMN and the VPLMN, including determining when the mobile station is roaming in the VPLMN and whether the VPLMN is a preferred network, wherein if the VPLMN is not a preferred network, the HPLMN sends a message to the mobile station to terminate a current transaction between the VPLMN and the HPLMN, and wherein the traffic redirection node is configured to passively monitor SS7 MAP signaling on the SS7 links.

2. The system of claim 1, wherein monitoring signaling between the HPLMN and the VPLMN further includes determining when the mobile station initiates a registration attempt with a non-preferred network.

3. The system of claim 2, wherein initiating comprises the mobile station sending a message to the HPLMN to update its location; and
sending a response to the mobile station indicating that the registration attempt is terminated, wherein the response comprises an error message.

4. The system of claim 3, wherein determining when a roaming mobile station initiates a registration attempt with a non-preferred network comprises reading a location update request from the mobile station.

5. The system of claim 4, wherein the error message comprises a message that an update location transaction is aborted.

6. The system of claim 2, wherein determining when a roaming mobile station initiates a registration attempt with a non-preferred network comprises reading an authentication request from a visited network.

7. The system of claim 6, wherein the error message comprises a message that a send authentication information transaction is aborted.

8. The system of claim 2, wherein monitoring signaling between the HPLMN and the VPLMN further includes:
determining when the mobile station initiates a subsequent registration attempt with a subsequent network, wherein the traffic redirection node is further configured to,
determine if the subsequent network is a non-preferred network:
if the subsequent network is a non-preferred network, send the response to the mobile station indicating that the registration attempt is terminated; and
if the subsequent network is determined to be a preferred network, proceeding with the registration attempt, wherein the mobile station is not aware of which networks are preferred and which networks are non-preferred.

9. A system for directing roaming network traffic, the system comprising:
a Home Public Mobile Network (HPLMN) that is a home network of a mobile station;
a Visited Public Mobile Network (VPLMN) configured to communicate with the HPLMN via a signaling network, wherein the mobile station is roaming when in the VPLMN; and
a traffic redirection node comprising high impedance probes on SS7 links between the HPLMN and the VPLMN, wherein the traffic redirection node is configured to monitor signaling between the HPLMN and the VPLMN, including determining when the mobile station is roaming in the VPLMN and whether the VPLMN is a preferred network, wherein if the VPLMN is not a preferred network, the HPLMN sends a message to the mobile station to terminate a current transaction between the VPLMN and the HPLMN, and wherein the traffic redirection node is configured to actively monitor SS7 MAP signaling on the SS7 links, wherein actively monitoring includes the traffic redirection node triggering messages to the mobile station and modifying messages exchanged between the HPLMN and the VPLMN.

10. The system of claim 9, wherein monitoring signaling between the HPLMN and the VPLMN further includes determining when the mobile station initiates a registration attempt with a non-preferred network.

11. The system of claim 10, wherein initiating comprises the mobile station sending a message to the HPLMN to update its location; and
sending a response to the mobile station indicating that the registration attempt is terminated, wherein the response comprises an error message.

12. The system of claim 11, wherein determining when a roaming mobile station initiates a registration attempt with a non-preferred network comprises reading a location update request from the mobile station.

13. The system of claim 12, wherein the error message comprises a message that an update location transaction is aborted.

14. The system of claim 10, wherein determining when a roaming mobile station initiates a registration attempt with a non-preferred network comprises reading an authentication request from a visited network.

15. The system of claim 14, wherein the error message comprises a message that a send authentication information transaction is aborted.

16. The system of claim 10, wherein monitoring signaling between the HPLMN and the VPLMN further includes:
  determining when the mobile station initiates a subsequent registration attempt with a subsequent network, wherein the traffic redirection node is further configured to,
    determine if the subsequent network is a non-preferred network:
    if the subsequent network is a non-preferred network, send the response to the mobile station indicating that the registration attempt is terminated; and
    if the subsequent network is determined to be a preferred network, proceeding with the registration attempt, wherein the mobile station is not aware of which networks are preferred and which networks are non-preferred.

* * * * *